United States Patent
Fang et al.

(10) Patent No.: US 8,833,955 B2
(45) Date of Patent: Sep. 16, 2014

(54) BACKLIGHT MODULE

(75) Inventors: Lindong Fang, Shenzhen (CN);
Yicheng Kuo, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 205 days.

(21) Appl. No.: 13/217,587

(22) Filed: Aug. 25, 2011

(65) Prior Publication Data

US 2012/0092854 A1 Apr. 19, 2012

(30) Foreign Application Priority Data

Oct. 18, 2010 (CN) .......................... 2010 1 0518765

(51) Int. Cl.
*G09F 13/04* (2006.01)
*G09F 13/08* (2006.01)
*F21V 8/00* (2006.01)
*G02F 1/1335* (2006.01)

(52) U.S. Cl.
CPC ............ G02B 6/0068 (2013.01); G02B 6/0088 (2013.01); *G02F 2001/133607* (2013.01)
USPC .......... 362/97.1; 362/609; 362/616; 362/628; 362/623; 362/561; 362/558; 362/511; 362/330; 362/97.2

(58) Field of Classification Search
CPC .................................................... G02B 6/0088
USPC ......... 362/609, 616, 628, 623, 561, 558, 511, 362/330, 97.1, 97.2
See application file for complete search history.

(56) References Cited

U.S. PATENT DOCUMENTS

| 3,958,113 | A | * | 5/1976 | Termohlen | .................... 362/231 |
| 7,077,554 | B2 | * | 7/2006 | Kim et al. | ..................... 362/603 |
| 7,490,971 | B2 | | 2/2009 | Iwasaki | |
| 8,057,087 | B2 | * | 11/2011 | Chang | ........................... 362/621 |
| 2007/0183137 | A1 | * | 8/2007 | Iwasaki | ............................ 362/97 |
| 2008/0112153 | A1 | * | 5/2008 | Iwasaki et al. | .................. 362/84 |
| 2009/0262521 | A1 | * | 10/2009 | Ito et al. | ....................... 362/97.1 |
| 2010/0008070 | A1 | * | 1/2010 | Lee | ................. 362/97.2 |
| 2010/0244058 | A1 | * | 9/2010 | Weng et al. | ..................... 257/88 |

FOREIGN PATENT DOCUMENTS

| CN | 1393729 A | 1/2003 |
| JP | 2001228477 A | 8/2001 |
| JP | 2007053019 A | 3/2007 |

* cited by examiner

*Primary Examiner* — Thomas Sember
*Assistant Examiner* — Tsion Tumebo
(74) *Attorney, Agent, or Firm* — Ditthavong & Steiner, P.C.

(57) ABSTRACT

A backlight module has a light guide plate, a back plate and light emitting assemblies. The light guide plate is substantially prism-like. The back plate has a shape corresponding to that of the light guide plate, and has an inclined first side plate and an inclined second side plate opposite to the first side plate. Each of the first and second side plates has at least one receiving recess, and the light emitting assemblies are received in the receiving recesses. In comparison with a side-light type backlight module, the present invention saves a heat-dissipation aluminum extrusion member. In comparison with a direct-light type backlight module, the present invention shortens the light mixing distance in a vertical direction, so as to reduce the module thickness.

7 Claims, 7 Drawing Sheets

BACKLIGHT MODULE

FIELD OF THE INVENTION

The present invention relates to a manufacture field of liquid crystal display (LCD), and more particularly to a backlight module.

BACKGROUND OF THE INVENTION

In a traditional technology, a light guide plate (LGP) in a side-light type LED (light emitting diode) backlight module is generally rectangular. FIG. 1A and FIG. 1B are schematic views of a structure of a side-light type LED backlight module in a traditional technology, wherein FIG. 1A is a perspective view, and FIG. 1B is a cross-sectional view of FIG. 1A taken along a line A-A. The backlight module comprises a back plate 11, two aluminum extrusion members 12, two driver circuit boards 13, a plurality of LEDs 14 and a light guide plate 15. The light guide plate 15 is disposed on a central portion of the back plate 11, and is a rectangular structure. The driver circuit board 13 is provided with the plurality of LEDs 14, and commonly mounted on two sides of the light guide plate 15 with the LEDs 14. The LEDs 14 generate light which is emitted into the light guide plate 15, and then scattered to form uniform light used as a backlight source of a liquid crystal display (LCD). The aluminum extrusion member 12 is mounted between the driver circuit board 13 and the back plate 11 which is used to dissipate heat generated during the LEDs work into the ambient environment by the high thermal conductivity of aluminum material. In a large-size side-light type LED backlight module, the LEDs 14 generate and accumulate heat, so that it needs to use the aluminum extrusion member 12 to guide the heat toward the bottom of the back plate 11 for dissipating the heat outward. Because the volume of the light guide plate 15 and the aluminum extrusion member 12 is considerably large, the backlight module of an LED backlight type display is relatively heavy. Because it inevitably needs to transmit the heat to the back plate 11 through the aluminum extrusion member 12, an area disposed with the aluminum extrusion member 12 will accumulate the heat, and thus the brightness and color generated by the light guide plate 15 may be uneven.

If wanting to reduce the weight, the backlight of the LED backlight type display generally must use the direct-light type design, i.e. the LEDs must be mounted on the bottom of the back plate in the backlight module. However, it needs a longer light mixing distance, so that the direct-light type LED backlight module needs a greater thickness.

As described above, the backlight design of the LED backlight modules in the traditional technology can not meet needs of light weight and compactness at the same time.

SUMMARY OF THE INVENTION

To solve the foregoing technical problems, an object of the present invention is to provide a backlight module applied to a liquid crystal display (LCD) for meeting needs of light weight and compactness of an LED backlight module at the same time.

To solve the above problems, the present invention provides a backlight module comprising a light guide plate, a back plate and a plurality of light emitting assemblies, wherein the light guide plate is substantially prism-like. The back plate has a shape corresponding to that of the light guide plate, and has an inclined first side plate and an inclined second side plate opposite to the first side plate, wherein each of the first and second side plates has at least one receiving recess, and the light emitting assemblies are received in the receiving recesses.

As a possible technical solution, the back plate is provided with a buffering support pad thereon, and the light guide plate is abutted against on the buffering support pad.

As a possible technical solution, the buffering support pad is mounted on a connection portion between the first side plate and the second side plate of the back plate.

As a possible technical solution, the light guide plate has a first side surface and two second side surfaces inclined opposite to the first side surface and symmetrically arranged to each other, wherein a connection portion of the two second side surfaces is abutted against on the buffering support pad.

As a possible technical solution, the receiving recess of the first side plate and the receiving recess of the second side plate are symmetrically arranged to each other.

As a possible technical solution, a connection between the light emitting assemblies and the receiving recess is selected from one of thermal conductive tape adhesion and screw connection.

As a possible technical solution, an opening of the receiving recess is covered with a light diffusion/guide strip, and light emitted by the light emitting assemblies passes through the light diffusion/guide strip to enter the light guide plate.

As a possible technical solution, a light output surface of the light diffusion/guide strip has a plurality of light diffusion particles, and at least one surface of the light diffusion/guide strip is frosted or coated with nano-material for enhancing the diffusion efficiency.

As a possible technical solution, a light input surface of the light diffusion/guide strip has first recesses, and a light output surface of the light diffusion/guide strip has second recesses, wherein a first planar surface is defined between each two of the adjacent first recesses, a second planar surface is defined between each two of the adjacent second recesses, and the first recesses of the light input surface and the second recesses of the light output surface are staggered and opposite to each other.

As a possible technical solution, the first recesses and the second recesses of the light diffusion/guide strip are V-shape or curved.

As a possible technical solution, the light input surface and the light output surface of the light diffusion/guide strip are waved.

As a possible technical solution, peaks and valleys of the light input surface are corresponding to valleys and peaks of the light output surface, respectively.

The advantages of the present invention are that a cross section of a bottom of the light guide plate is designed to be a shape of isosceles triangle, and two sides of the shape of isosceles triangle are disposed with the light emitting assemblies. In comparison with a side-light type backlight module in a traditional technology, the light emitting assemblies are directly mounted on the back plate, so as to save a heat-dissipation aluminum extrusion member. Thus, the weight of the light guide plate can be reduced, while the brightness and color of the module become uniform. In comparison with a direct-light type backlight module, the two inclined sides of the shape of isosceles triangle are used to mix light based on the transverse width of the light guide plate, so as to shorten the light mixing distance in a vertical direction and thus reduce the module thickness.

Furthermore, the surface of the light emitting assemblies can be covered with light diffusion/guide strips to further reduce the module thickness. The function of the light diffusion/guide strips is to diffuse the light emitted from the light emitting assemblies, and thus this function is similar to the function of the light guide plate. In comparison with the light guide plate, the light diffusion/guide strips are directly covered on the openings of the receiving recesses, to tightly cover on the surface of the light emitting assemblies, so that it is helpful to enhance the diffusion efficiency of the light, and thus has better effect than that of the light guide plate for further lowering the thickness of the light guide plate. The light emitting assemblies are installed in the receiving recesses of the back plate, so that it is possible to implement the technical solution of covering the light diffusion/guide strip on the light emitting assemblies.

DETAILED DESCRIPTION OF THE PREFERRED EMBODIMENTS

A backlight module according to a preferred embodiment of the present invention is described more detailed by referring to the following detailed description and the accompanying drawings.

The objects, features and advantages of the present invention can be best understood by referring to the following detailed description of the preferred embodiments and the accompanying drawings. The specification of the present invention provides different embodiments to describe technical features of different implementation solutions, wherein arrangement of various elements in the embodiments is used to clearly describe the content of the present invention, but the present invention is not limited thereto. Meanwhile, numerals of drawings are partially repeated between different embodiments for simplifying the description, but not for building the relationship between the different embodiments.

Figure 1A:
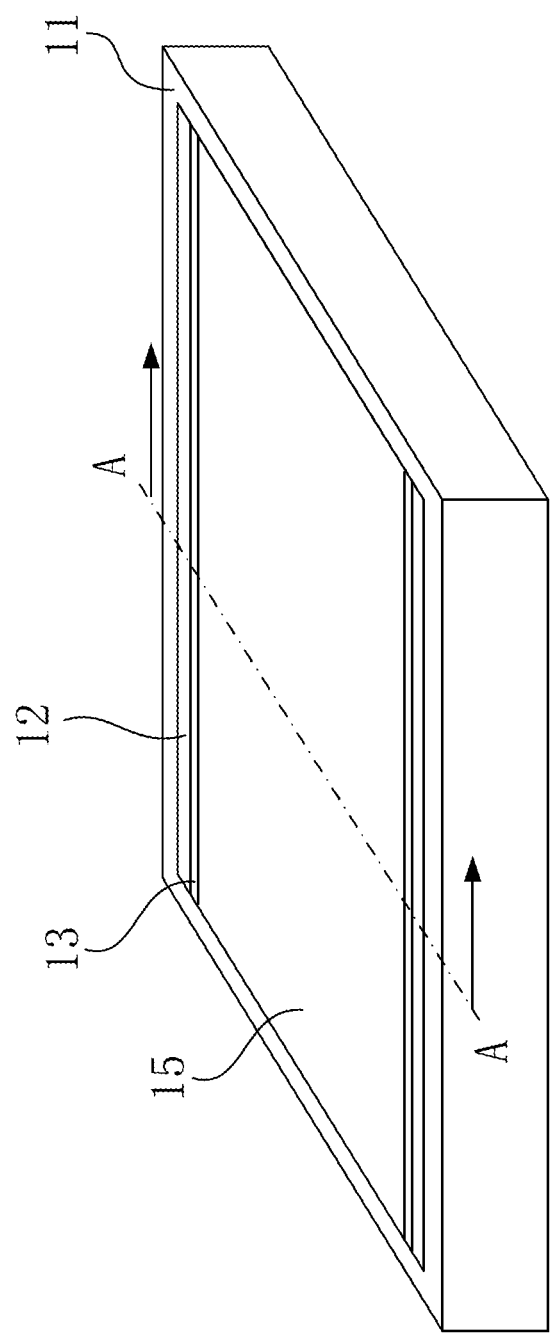
FIGS. 1A and 1B are schematic views of a structure of a side-light type LED backlight module in a traditional technology.
Figure 1B:
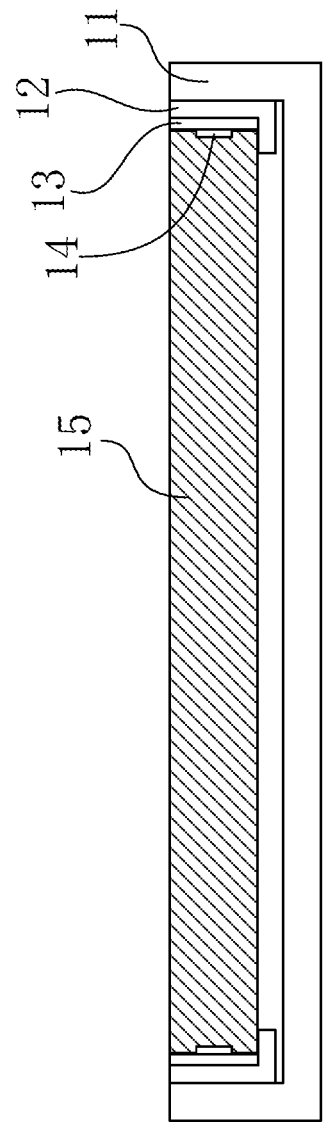
Figure 2A:
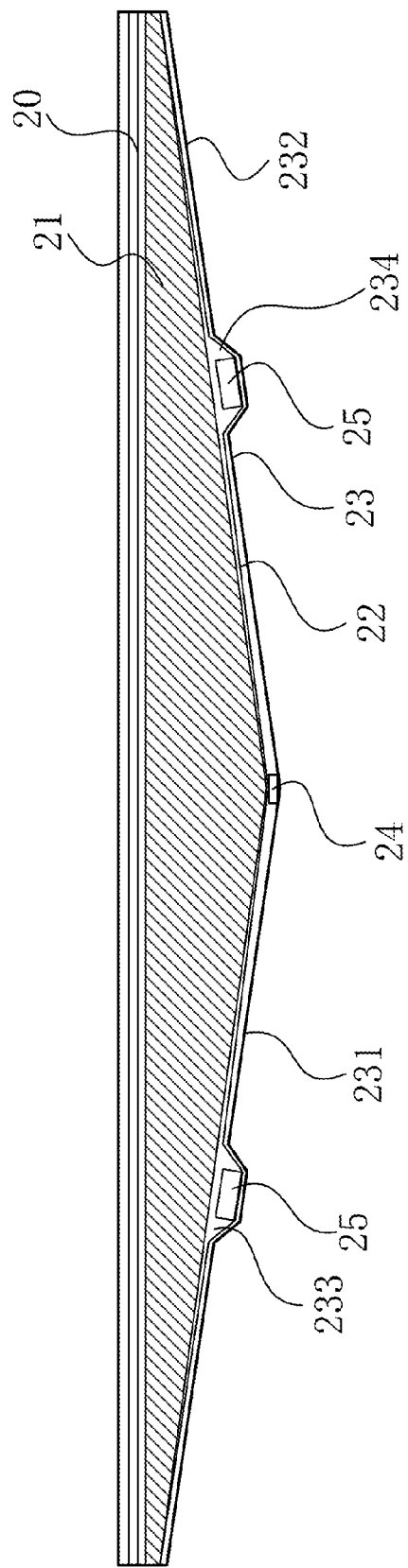
FIG. 2A is a cross-sectional view of a structure of a backlight module according to a preferred embodiment of the present invention.

FIG. 2A is a cross-sectional view of a structure of a backlight module according to a preferred embodiment of the present invention, wherein the backlight module comprises optical films 20, a light guide plate 21, a reflective sheet 22, a back plate 23 and light emitting assemblies 25. An upper surface of the back plate 23 is stacked with the light guide plate 21 and the optical films 20 in turn. The reflective sheet 22 is further disposed between the back plate 23 and the light guide plate 21, wherein the reflective sheet 22 are tightly attached to an inner surface of the back plate 23, and used to reflect light reflected from the light guide plate 21. The backlight module of FIG. 2A further comprises a buffering support pad 24 between the light guide plate 21 and the back plate 23, wherein the buffering support pad 24 provides a buffering function of supporting the light guide plate 21, so as to prevent a bottom of the light guide plate 21 from being directly in contact with the back plate 23.

Figure 2B:
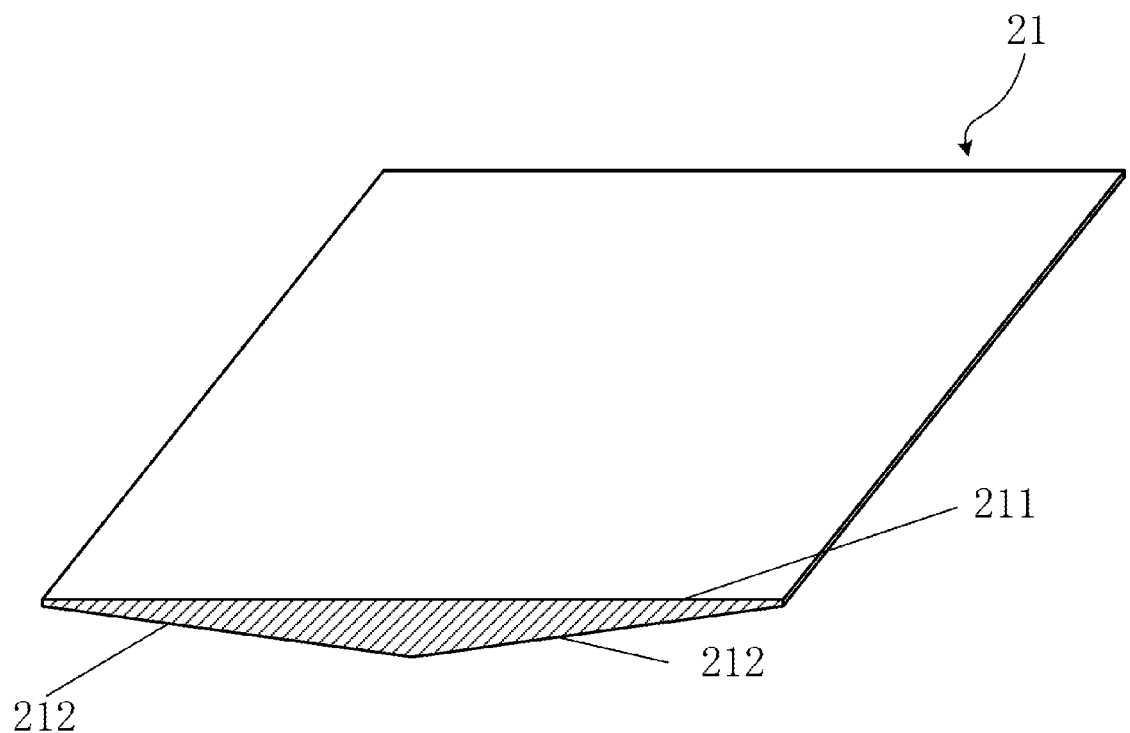
FIG. 2B is a perspective view of a light guide plate of FIG. 2A.

FIG. 2B is a perspective view of the light guide plate 21 of FIG. 2A. Referring to FIG. 2B, the light guide plate 21 is substantially prism-like, wherein a cross section of the light guide plate 21 is substantially a shape of isosceles triangle. The light guide plate 21 has a first side surface 211 and two second side surfaces 212 inclined opposite to the first side surface 211 and symmetrically arranged to each other, wherein the optical films 20 are covered on the first side surface 211.

Referring still to FIG. 2A, the back plate 23 has a shape corresponding to that of the two second side surfaces 212 of the light guide plate 21, and has an inclined first side plate 231 and an inclined second side plate 232 which is connected and opposite to the first side plate 231, wherein the first side plate 231 and the second side plate 232 have at least one first receiving recess 233 and at least one second receiving recess 234, respectively. Two of the light emitting assemblies 25 are received in the first receiving recess 233 and the second receiving recess 234, respectively. Preferably, the first receiving recess 233 and the second receiving recess 234 are symmetrically arranged to each other. In addition, the number of the first receiving recess 233 and the second receiving recess 234 can be one or more, respectively. For example, each of the number of the first receiving recess 233 and the second receiving recess 234 is exemplified by one in present invention.

Preferably, the buffering support pad 24 is mounted on a connection portion between the first side plate 231 and the second side plate 232. The two second side surfaces 212 of the light guide plate 21 are arranged adjacent to the first side plate 231 and the second side plate 232 of the back plate 23. A connection portion of the two second side surfaces 212 of the light guide plate 21 is abutted against on the buffering support pad 24.

Figure 3A:
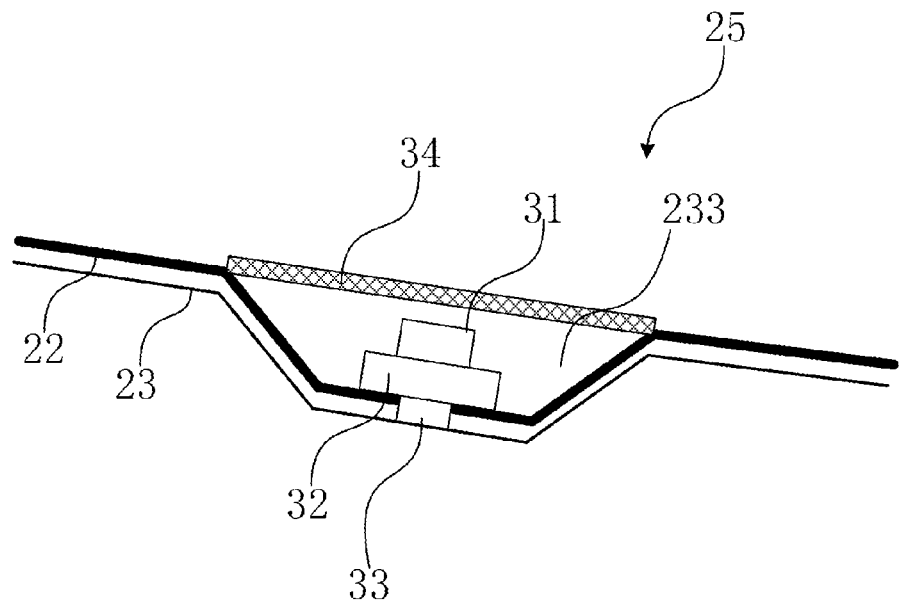
FIG. 3A is a schematic view of a structure of a light emitting assembly according to the preferred embodiment of the present invention.

FIG. 3A is a cross-sectional view of the light emitting assembly 25 according to the preferred embodiment of the present invention. In the preferred embodiment, the light emitting assembly 25 is LED (light emitting diode) type light emitting assembly, which comprises a plurality of LEDs 31, a driver circuit board 32, a light diffusion/guide strip 34 and a thermal conductive tape 33. The LEDs 31 are mounted on the driver circuit board 32 along a linear direction thereof, wherein the driver circuit board 32 is a strip-like circuit board. The driver circuit board 32 mounted with the LEDs 31 constructs a light bar which is installed on a bottom of the first receiving recess 233. In the embodiment, the driver circuit board 32 is attached to the first receiving recess 233 of the back plate 23 through the thermal conductive tape 33. The corresponding second receiving recess 234 has the same structure, and thus the description and drawing thereof are omitted herein. In other embodiments, the type of the light emitting assembly 25 is not limited to use the LEDs as components of light source, and also can be various common types of light source including CCFL (cold cathode fluorescent lamp) and etc.

Figure 3B:
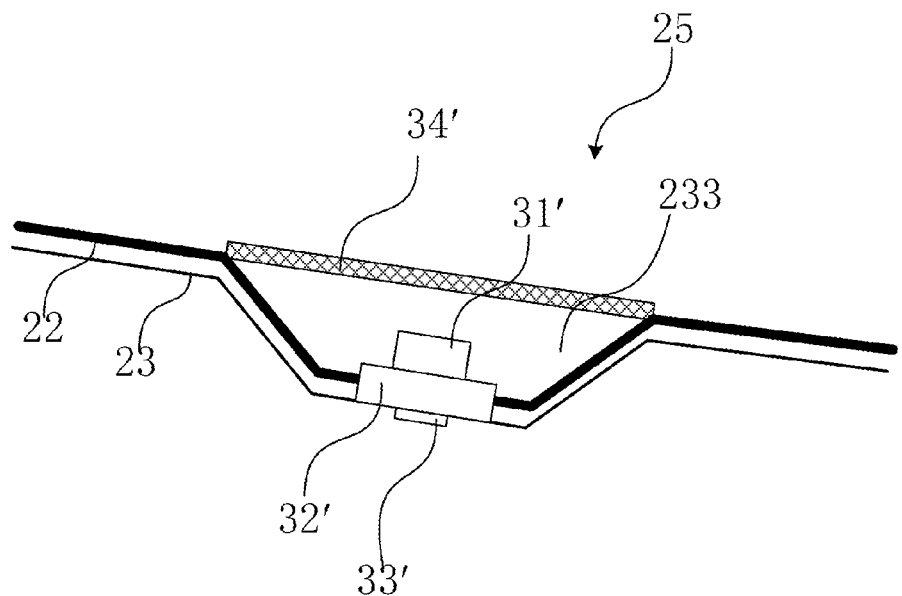
FIG. 3B is a schematic view of a structure of a light emitting assembly according to another preferred embodiment of the present invention.

FIG. 3B is a cross-sectional view of a light emitting assembly 25 according to another preferred embodiment of the present invention. The light emitting assembly 25 comprises a plurality of LEDs 31', a driver circuit board 32', screws 33' and a light diffusion/guide strip 34'. The difference between the embodiment and the foregoing embodiment of FIG. 3A is that: the embodiment uses the screws 33' to connect the driver circuit board 32' to the back plate 23. For the strip-like driver circuit board 32', the screws 33' are spaced a predetermined distance and equidistantly arranged on the driver circuit board 32' along a direction vertical to the plane of the drawing. Generally, the adhesion of using the thermal conductive tape 33 has a better heat dissipation effect than that of the connection of using the screws 33'. But, if the driver circuit board 32' is a metal-based printed circuit board and the flatness of the metal-based printed circuit board and the back plate is good, the heat dissipation effect of mounting the LED type light emitting assembly 25 on the back plate 23 through the screws 33' will be better than the heat dissipation effect of mounting the LED type light emitting assembly 25 on the back plate 23 through the thermal conductive tape 33.

Referring still to FIG. 3A, the light diffusion/guide strip 34 is covered on an opening of the first receiving recess 233, wherein the light emitted from the LED type light emitting assembly 25 passes through the light diffusion/guide strip 34 and enter the light guide plate 21. The function of the light diffusion/guide strip 34 is to diffuse the light emitted from the LEDs 31 and then guide the diffused light into the light guide plate 21. The light diffusion/guide strip 34 is close to the surface of the LEDs 31, so that the light diffusion efficiency thereof is very high and thus the thickness of the light guide plate 21 can be further reduced. The second receiving recess 234 is also mounted with the same light diffusion/guide strip 34, so that the description and drawing thereof are omitted herein.

Figure 4A:
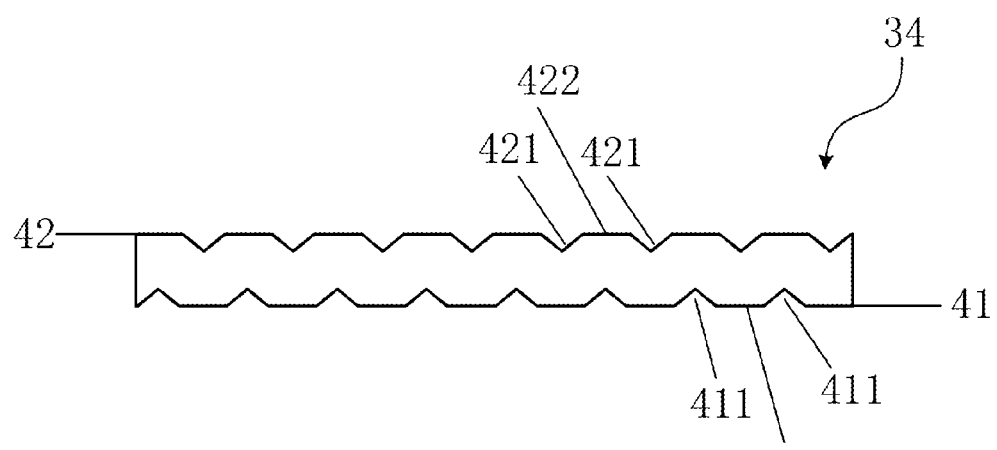
FIG. 4A is a schematic view of a surface of a light diffusion/guide strip according to the preferred embodiment of the present invention.

FIG. 4A is a cross-sectional view of the light diffusion/guide strip 34 according to the preferred embodiment of the present invention, wherein a light input surface 41 of the light diffusion/guide strip 34 has V-shape first recesses 411, and a light output surface 42 thereof has V-shape second recesses 421. A first planar surface 412 is defined between each two of the adjacent first recesses 411, while a second planar surface 422 is defined between each two of the adjacent second recesses 421. Furthermore, the first recesses 411 of the light input surface 41 and the second recesses 421 of the light output surface 42 are staggered and opposite to each other. In other words, the first recesses 411 of the light input surface 41 and the second planar surfaces 422 of the light output surface 42 are corresponding to each other in a vertical direction, while the first planar surfaces 412 of the light input surface 41 and the second recesses 421 of the light output surface 42 are corresponding to each other.

Figure 4B:
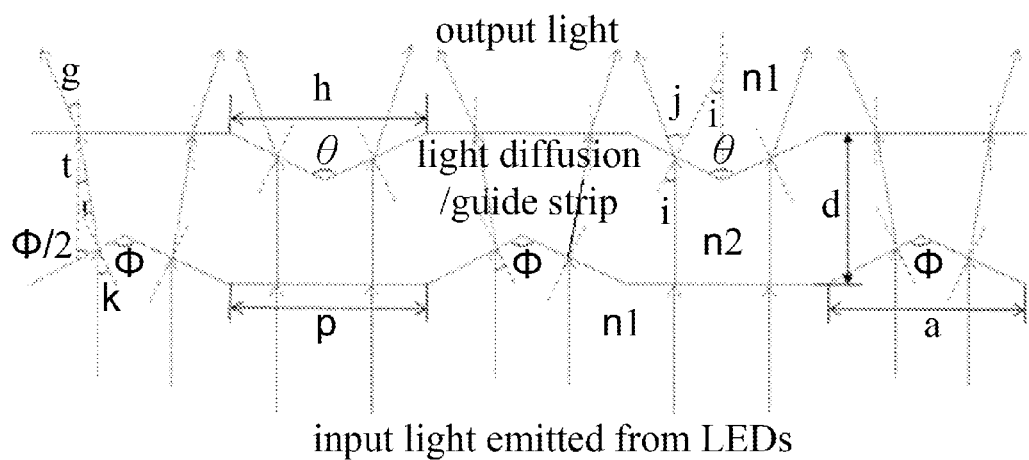
FIG. 4B is a schematic view of a light pathway of the light diffusion/guide strip according to the preferred embodiment of the present invention.

FIG. 4B is a schematic view of a light pathway of the light diffusion/guide strip 34 according to the preferred embodiment of the present invention during guiding the light. As shown in the view of the light pathway, an included angle θ of the recess on the light output surface of the light diffusion/guide strip must satisfy the following condition:

$$\theta > [90 - \arcsin(n1/n2)] \times 2$$

To prevent the light from generating the total reflection on the light output surface of the light diffusion/guide strip to loss the light due to the increase of the light pathway, $$i < \arcsin(n1/n2) \theta/2 + i = 90° \rightarrow \theta > [90 - \arcsin(n1/n2)] * 2 \quad (I)$$

wherein n1 is the refractive index of air, and the value thereof is 1; if the light diffusion/guide strip is made of polymethyl methacrylate (PMMA), the value of n2 is 1.49.

The calculated result is θ>95.68°

If the light diffusion/guide strip is made of polycarbonate (PC), the value of n2 is 1.59. The calculated result is θ>101.82°

Moreover, other material, including methylmetahacrylate styrene (MS) and polystyrene (PS) and etc., also can be used.

The included angle φ of the recesses on the light input surface of the light diffusion/guide strip must satisfy:

$$\phi/2 + \arcsin[\cos(\phi/2)*n1/n2] > 180° - \arcsin(n1/n2)$$

$$k = 90° - \phi/2$$

$$\sin k * n1 = \sin r * n2 \rightarrow r = \arcsin[\sin(90° - \phi/2)*n1/n2]$$

$$\phi/2 + r + t = 180° t = 180° - \phi/2 - \arcsin[\cos(\phi/2)*n1/n2]$$

To prevent from generating the total reflection on the light output surface of the light diffusion/guide strip, having:

$$t < \arcsin(n1/n2)$$

then, having:

$$180° - \phi/2 - \arcsin[\cos(\phi/2)*n1/n2] < \arcsin(n1/n2)$$

The calculated result is:

$$\phi/2 + \arcsin[\cos(\phi/2)n1/n2] > 180° - \arcsin(n1/n2) \quad (II)$$

The foregoing two equations (I) and (II) are only rough calculation of θ and φ and when the distance between the LEDs and the light diffusion/guide strip is considerably greater than sizes (h, p, a, and etc.) in FIG. 4B To optimize the diffusion effect of emitting light through the light diffusion/guide strip, it needs to use a light tracking simulation software for simulating to ensure the values in the drawing (θ, φ, h, p, a, d and etc.).

Figure 4C:
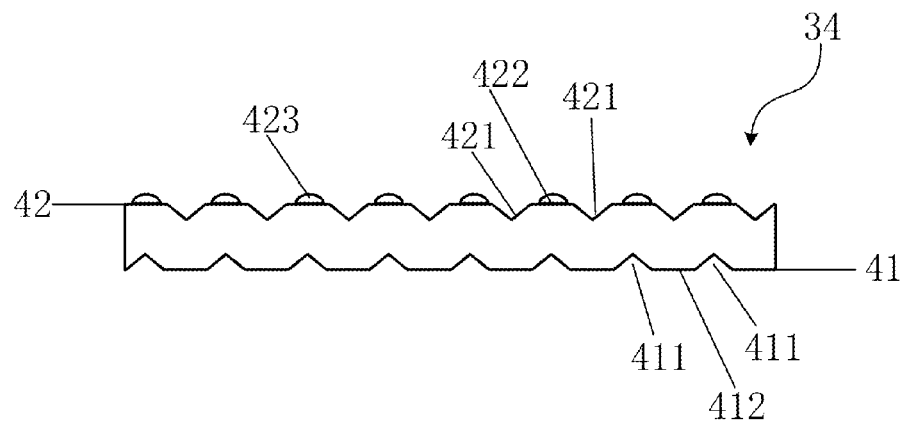
FIG. 4C is a schematic view of a surface of a light diffusion/guide strip according to another preferred embodiment of the present invention.

FIG. 4C is a schematic view of a surface of another light diffusion/guide strip 34 further optimized based on the structure of FIG. 4A. The planar surface 422 of the light output surface 42 is further covered with a plurality of light diffusion particles 423 for further diffusing/scattering the emitted light.

Moreover, in other embodiments, the surface of the light diffusion/guide strip 34 also can be frosted, or the light diffusion/guide strip 34 can be coated with nano-material, in order to enhance the diffusion efficiency. The light input surface 41 and the light output surface 42 of the light diffusion/guide strip 43 also can be waved. Peaks and valleys of the light input surface 41 are corresponding to valleys and peaks of the light output surface 42, respectively. In addition, the first recesses 411 and the second recesses 421 of the light diffusion/guide strip 43 are not limited to V-shape, but also can be curved.

Figure 5:
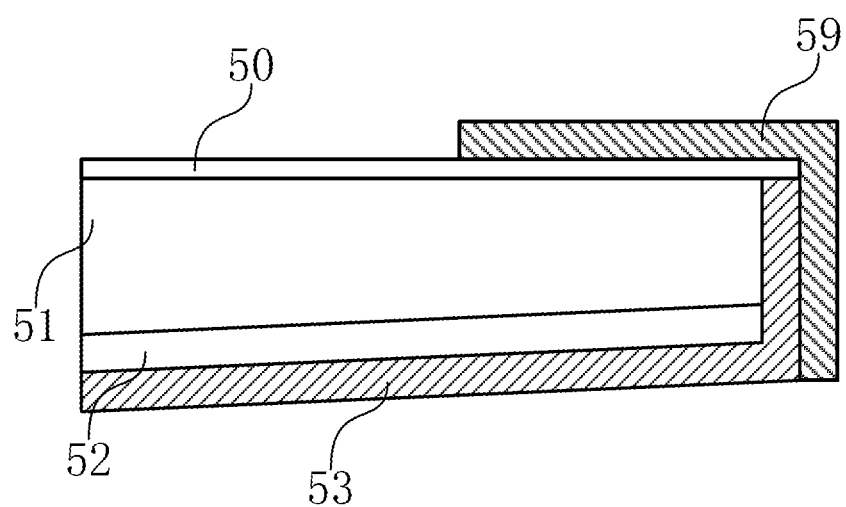
FIG. 5 is a partially cross-sectional view of the structure of the backlight module of FIGS. 2A and 2B according to the preferred embodiment of the present invention.

FIG. 5 is a partially cross-sectional view of the structure of the backlight module having the light guide plate of FIGS. 2A and 2B according to the preferred embodiment of the present invention, wherein the backlight module comprises optical films 50, a light guide plate 51, a reflective sheet 52, a back plate 53 and a housing 59, wherein the housing 59 encloses edges of the back plate 53. For clear description, FIG. 5 only illustrates a schematic view of the installation structure of one end of the back plate 53 and the housing 59, wherein the other end of the back plate 53 is symmetric to this end. Relationships of other components of the light guide plate can be referring to FIG. 2A, FIG. 2B, other drawings and descriptions thereof, and thus the description thereof will be omitted herein.

The installation of FIG. 5 shows an outer engagement type installation of the housing 59, i.e. a side wall of the housing 59 is located outside a side wall of the back plate 53, and the side wall of the back plate 53 is engaged in the side wall of the housing 59. The other installation is an inner engagement type installation, wherein the side wall of the housing 59 is located inside the side wall of the back plate 53, and the side wall of the back plate 53 is engaged outside the side wall of the housing 59. The two installations have no apparent difference, and thus drawings of the inner engagement type installation are omitted herein.

The foregoing descriptions are only the preferred embodiment of the present invention, and it is understood that many changes and modifications to the described embodiment made by the man skilled in the art can be carried out without departing from the scope and the spirit of the invention that is intended to be limited only by the appended claims.

The invention claimed is:

1. A backlight module, comprising a light guide plate, a back plate and a plurality of light emitting assemblies, wherein the light guide plate is prismatic;

the back plate has a shape corresponding to that of the light guide plate, and has an inclined first side plate and an inclined second side plate opposite to the first side plate, wherein each of the first and second side plates has at least one receiving recess, and the light emitting assemblies are received in the receiving recesses;

wherein the back plate is provided with a buffering support pad thereon, and the light guide plate is abutted against on the buffering support pad, the buffering support pad is mounted on a connection portion between the first side plate and the second side plate of the back plate, and the buffering support pad is disposed at a position between the receiving recess of the first side plate and the receiving recess of the second side plate to prevent obstructing light emitted by the light emitting assemblies received in the receiving recesses; and an opening of the receiving recess is covered with a light diffusion/guide strip, and light emitted by the light emitting assemblies passes through the light diffusion/guide strip to enter the light guide plate, wherein a light input surface of the light diffusion/guide strip has first recesses, and a light output surface of the light diffusion/guide strip has second recesses, wherein a first planar surface is defined between each two of the adjacent first recesses, a second planar surface is defined between each two of the adjacent second recesses, wherein the first recesses of the light input surface and the second planar surfaces of the light output surface are corresponding to each other in a vertical direction, while the first planar surfaces of the light input surface and the second recesses of the light output surface are corresponding to each other in a vertical direction.

2. The backlight module according to claim 1, wherein the light guide plate has a first side surface and two second side surfaces inclined opposite to the first side surface and symmetrically arranged to each other, wherein a connection portion of the two second side surfaces is abutted against on the buffering support pad.

3. The backlight module according to claim 1, wherein the receiving recess of the first side plate and the receiving recess of the second side plate are symmetrically arranged to each other.

4. The backlight module according to claim 1, wherein the second planar surfaces of the light output surface of the light diffusion/guide strip are covered with a plurality of light diffusion particles.

5. The backlight module according to claim 1, wherein the light diffusion/guide strip has at least one surface, and the at least one surface of the light diffusion/guide strip is frosted or coated with nano-material.

6. The backlight module according to claim 1, wherein a connection between the light emitting assemblies and the receiving recess is selected from one of thermal conductive tape adhesion and screw connection.

7. The backlight module according to claim 1, wherein the first recesses and the second recesses of the light diffusion/guide strip are V-shape or curved.

\* \* \* \* \*